(12) United States Patent
Roberts

(10) Patent No.: US 6,315,098 B1
(45) Date of Patent: Nov. 13, 2001

(54) MULTI-MODE ROLLING ELEMENT CLUTCH ASSEMBLY

(75) Inventor: John Edward Roberts, Los Altos, CA (US)

(73) Assignee: General Dynamics Goverment Systems Corporation, Mountain View, CA (US)

( * ) Notice: Subject to any disclaimer, the term of this patent is extended or adjusted under 35 U.S.C. 154(b) by 0 days.

(21) Appl. No.: 09/211,537

(22) Filed: Dec. 15, 1998

(51) Int. Cl.$^7$ ........................................... F16D 15/00
(52) U.S. Cl. .................................. 192/44; 192/46
(58) Field of Search .................. 192/43, 44, 45, 192/46, 41 R

(56) References Cited

U.S. PATENT DOCUMENTS

| | | |
|---|---|---|
| 382,637 | 5/1888 | Curtis . |
| 592,213 | * 10/1897 | Smith .............................. 192/44 X |
| 2,232,090 | 2/1941 | Anderson ............................... 192/45 |
| 2,307,881 | 1/1943 | Dodge .................................... 192/45 |
| 3,006,447 | 10/1961 | Irwin ................................. 192/45.1 |
| 4,434,878 | * 3/1984 | Okubo ............................... 192/44 X |
| 4,635,770 | 1/1987 | Shoji et al. ......................... 192/41 A |
| 4,635,771 | 1/1987 | Shoji et al. ......................... 192/41 A |
| 5,449,057 | 9/1995 | Frank ..................................... 192/46 |
| 5,573,094 | 11/1996 | Roberts .................................. 192/45 |
| 5,638,929 | * 6/1997 | Park ....................................... 192/44 |

* cited by examiner

Primary Examiner—Rodney H. Bonck
Assistant Examiner—Saúl Rodríguez
(74) Attorney, Agent, or Firm—Jenner & Block, LLC

(57) ABSTRACT

A multi-mode rolling element clutch assembly including first and second race members and a plurality of rolling elements. The first race member defines a first race surface having a ratchet surface portion. The second race member defines a second race surface. The first second race surfaces define a raceway therebetween. A plurality of rolling elements are disposed in the raceway. The ratchet surface portion has a multi-mode ratchet mechanism for providing first and second ratchet configurations. When the multi-mode ratchet mechanism is in the first ratchet configuration, the rolling elements may provide rolling support between the first and second race members when the first race member moves in a first direction relative to the second race member, and one of the rolling elements may engage the first ratchet surface portion when the first race member moves in a second direction relative to the second race member, thereby providing load transmission capability. When the multi-mode ratchet mechanism is in the second ratchet configuration, the rolling elements may provide rolling support between the first and second race members when the first race member moves in the second direction relative to the second race member, and one of the rolling elements may engage the first ratchet surface portion when the first race member moves in the first direction relative to the second race member, thereby providing load transmission capability.

17 Claims, 6 Drawing Sheets

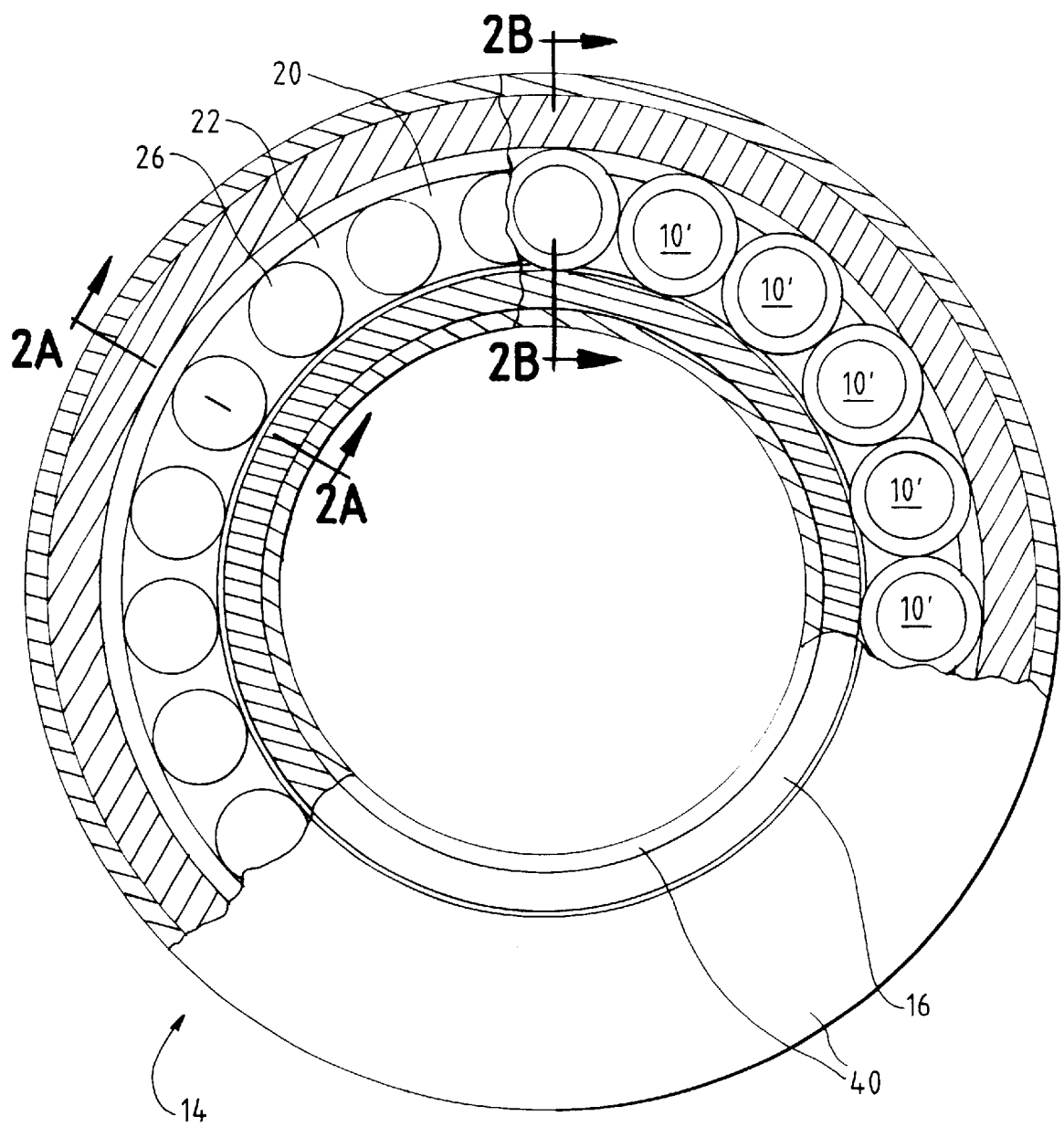

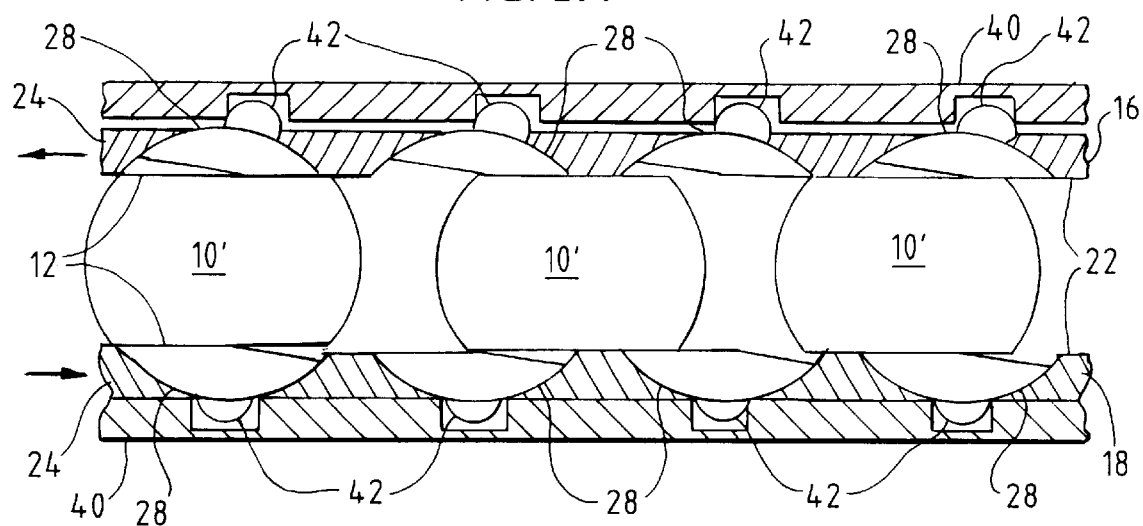
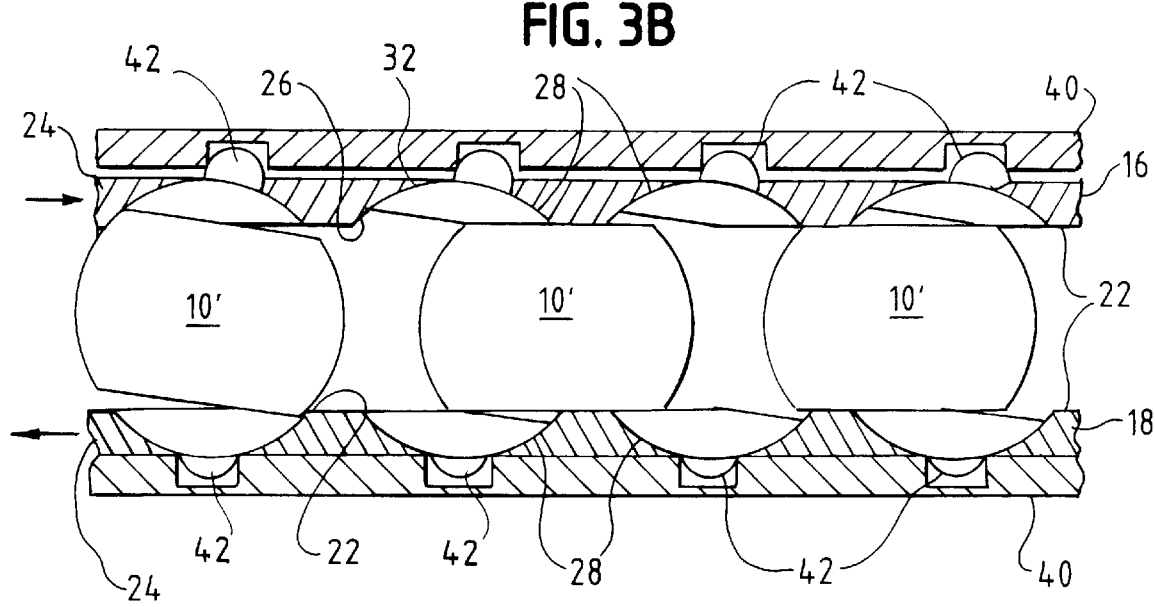

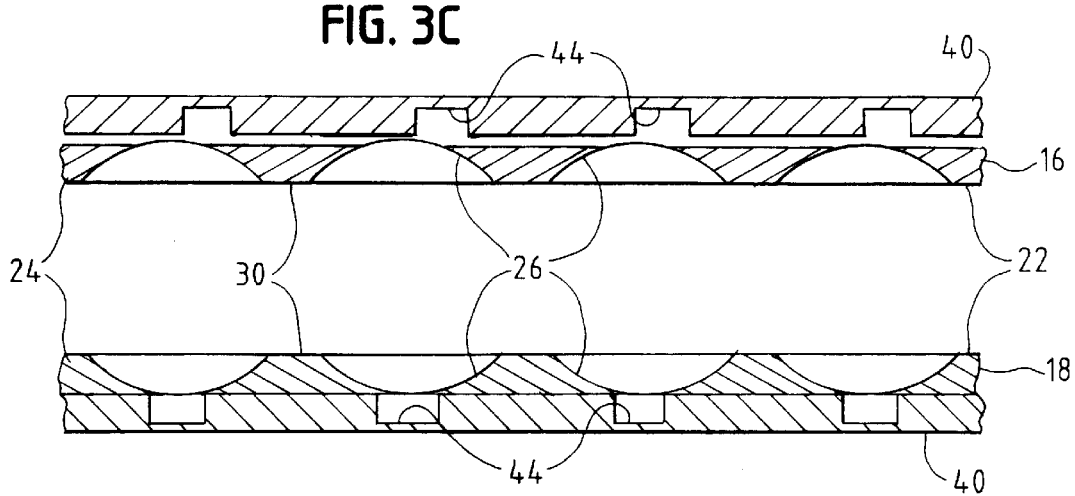
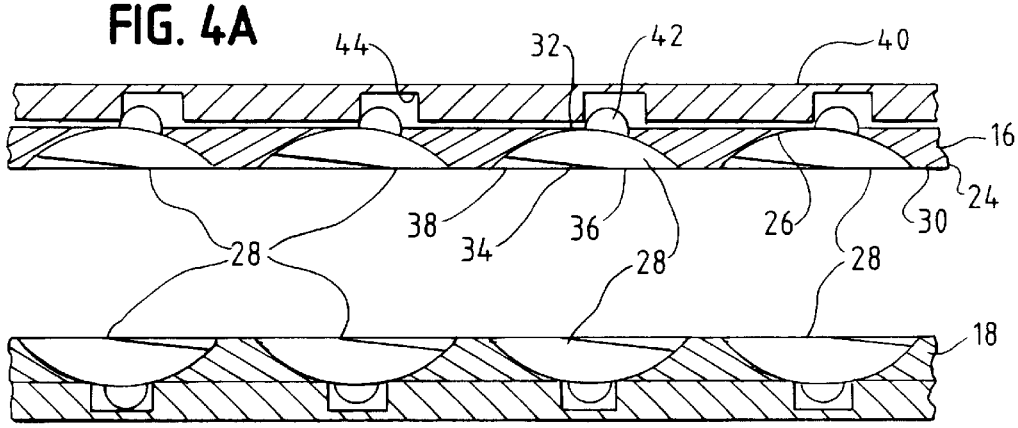
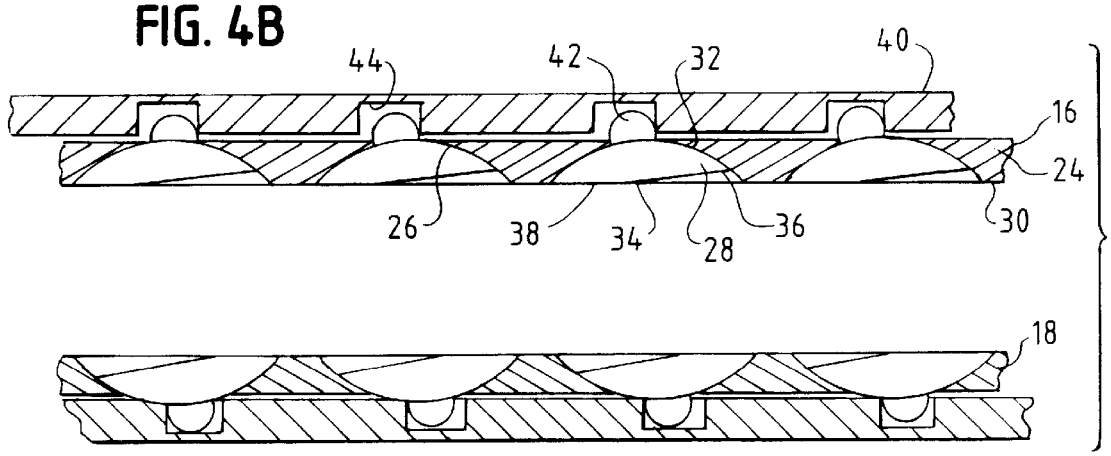

MULTI-MODE ROLLING ELEMENT CLUTCH ASSEMBLY

BACKGROUND OF THE INVENTION

1. Field of the Invention

The present invention pertains to the field of clutch mechanisms, and, in particular, to a rolling element clutch. More particularly, the present invention relates to a multi-mode rolling element clutch.

2. Description of the Related Art

A freewheel clutch is a device that will drive a rotating load in one direction, but will allow it to freewheel or spin at any speed in the other direction. There is a need to make a more compact and rugged freewheel clutch. Most current designs need separate devices to support a non-drive load on the shaft and to have the shaft transmit a drive load. Current techniques are called ratchet and pawl, wrap spring, sprag, roller clutch, ball clutch, tilting plate, and so forth. Each of these related art devices needs the addition of some bearing device to support the non-drive load when it is in the freewheel mode.

Typical of the related art is U.S. Pat. No. 4,635,771, which discloses a one-way clutch bearing having an outer race with an annular inner surface, an inner race with an annular outer surface corresponding to and concentric with the inner surface, and rolling members disposed in an annular space formed between the inner surface and the outer surface, whereby relative rotation of the inner and outer races in one direction is prevented by displacement of the rolling members in the space and a torque is transmitted. A holding means for holding the rolling members is provided at a displacement position whereat the rolling members transmit a predetermined transmission torque, and a means is provided for decreasing a wedge angle at a position before the rolling members arrive at the displacement position.

U.S. Pat. No. 5,573,094, which is assigned in common with the present invention and incorporated herein by reference, discloses a combination bearing/freewheel clutch which is provided with an inner race member defining an inner race surface, an outer race member defining an outer race surface concentric with the inner race member, and a raceway between the inner and outer races. The inner and outer race members each have a series of short radially oriented sawtooth inclines in their respective inner and outer race surfaces at right angles to the raceway. A plurality of modified ball bearings, for instance ball bearings have flattened poles, are disposed in the raceway between the inner and outer race members, such that the modified ball bearings serve to prevent relative rotation of the inner and outer race members in one direction, and to transmit a torque between the inner and outer races.

U.S. patent application Ser. No. 09/206,618 (attorney docket number: 98-903), titled "A Rolling-Element Clutch Assembly," and filed Dec. 7, 1998, is assigned in common with the present invention and incorporated herein by reference. Application Ser. No. 09/206,618 discloses a plurality of improvements to the invention of U.S. Pat. No. 5,573,094.

The invention of U.S. Pat. No. 5,573,094 represents a significant development in the art of combination bearing/freewheel clutches. However, there is a need for a multi-mode rolling element clutch assembly that, in a first configuration, supports a non-drive load between two components while allowing the components to freely move relative to one another in a first direction and transmits a drive load between the two components when the two components attempt to move relative to one another in a second direction, and that can easily and reliably be converted into a second, reversed configuration that transmits the drive load in the first direction and allows the non-drive load to move freely in the second direction.

SUMMARY OF THE INVENTION

The multi-mode rolling element clutch assembly of the present invention reduces the mechanical complexity, volume and weight normally required if more traditional devices are used. A single multi-mode rolling element clutch assembly may replace the separate bearings, electromechanical clutches, and/or combinations of brakes and freewheels in any given application. Accordingly, the present invention may find application in fail safe designs for conveyors, elevators, escalators, cable cars, machine tools, monorail trains, etc. The present invention may also provide an anti-backlash capability that could, for instance, replace holding brakes and other devices, add safety and stability to rack-and-pinion steering mechanisms and material feed mechanisms, and augment and stiffen linear actuators.

The advantages and purposes of the invention will be set forth in part in the description which follows, and in part will be obvious from the description, or may be learned by practice of the invention. The advantages and purposes of the invention will be realized and attained by means of the elements and combinations particularly pointed out in the appended claims.

To attain the advantages and in accordance with the purpose of the invention, as embodied and broadly described herein, the multi-mode rolling element clutch assembly, in a first aspect, includes a first race member defining a first race surface having a first ratchet surface portion, a second race member defining a second race surface, the first race surface and the second race surface defining a raceway therebetween, and a plurality of rolling elements disposed in the raceway. The first ratchet surface portion has a first multi-mode ratchet mechanism for providing a first and a second ratchet configuration. When the first multi-mode ratchet mechanism is in the first ratchet configuration, the rolling elements may provide rolling support between the first race member and the second race member when the first race member moves in a first direction relative to the second race member, and at least one of the plurality of rolling elements may engage the first ratchet surface portion when the first race member moves in a second direction relative to the second race member, thereby impeding relative motion between the first race member and the second race member and providing load transmission capability. When the first multi-mode ratchet mechanism is in the second ratchet configuration, the rolling elements may provide rolling support between the first race member and the second race member when the first race member moves in the second direction relative to the second race member, and at least one of the plurality of rolling elements may engage the first ratchet surface portion when the first race member moves in the first direction relative to the second race member, thereby impeding relative motion between the first race member and the second race member and providing load transmission capability. The first multi-mode ratchet mechanism may include at least one ratchet segment movable from a first position to a second position, a ratchet wall defining at least one concavity for accommodating the at least one ratchet segment, and a reversing member coupled to the at least one ratchet segment and for moving the at least one ratchet segment from the first position to the second position.

In a second aspect, the invention encompasses a method of operating the multi-mode rolling element clutch assembly having a first race member defining a first race surface and a first ratchet portion, a second race member defining a second race surface, the first and second race surfaces defining a raceway therebetween, a plurality of rolling elements disposed in the raceway, and the first ratchet portion having a first multi-mode ratchet mechanism for providing a first and a second ratchet configuration. The method includes the steps of operating the first multi-mode ratchet mechanism to establish the first ratchet configuration; providing rolling support, via the rolling elements, between the first and second race members when the first race member moves in a first direction relative to the second race member; operating the first multi-mode ratchet mechanism to establish the second ratchet configuration; and providing rolling support, via the rolling elements, between the first and second race members when the first race member moves in the second direction relative to the second race member. The method may also include, after the step of operating the first multi-mode ratchet mechanism to establish the first ratchet configuration, the step of providing load transmission between the first and second race members when the first race member attempts to move in a second direction relative to the second race member, and, after the step of operating the first multi-mode ratchet mechanism to establish the second ratchet configuration, the step of providing load transmission between the first and second race members when the first race member attempts to move in the first direction relative to the second race member.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1 is a top view of a first embodiment of the multi-mode rolling element clutch of the present invention showing, in a first cut-away, the rolling elements in the raceway, and in a second cut-away, the ratchet mechanism within the raceway with rolling elements removed.

FIG. 3A is a partial cross-sectional side view of the embodiment of FIG. 1 with the reversing members in a first configuration and the invention operating in the bearing setting.

FIG. 3B is a partial cross-sectional side view of the embodiment of FIG. 1 with the reversing members in a first configuration and the invention operating in the clutch setting.

FIG. 3C is a partial cross-sectional side view of the embodiment of FIG. 1 with rolling element and ratchet segments removed for clarity.

FIG. 4A is a partial cross-sectional side view of the embodiment of FIG. 1 with the reversing members in a first configuration, the ratchet segments in a first position, and the rolling elements removed for clarity.

FIG. 4B is a partial cross-sectional side view of the embodiment of FIG. 1 with the reversing members in a second configuration, the ratchet segments in a second position, and the rolling elements removed for clarity.

DESCRIPTION OF THE PREFERRED EMBODIMENTS

Figure 2A:
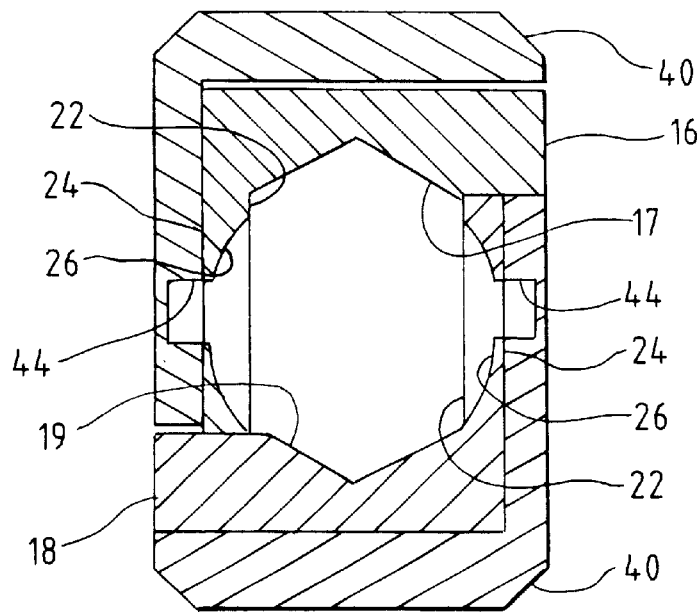
FIG. 2A is a radial cross-sectional view of the embodiment of FIG. 1, with rolling element and ratchet segments removed for clarity.

Reference will now be made in detail to the present preferred exemplary embodiments of the invention, which are illustrated in the accompanying drawings. Wherever possible, the same reference numbers will be used throughout the drawings to refer to the same or like parts.

A clutch is a device that can engage (or disengage) to transmit (or not transmit), respectively, a drive load from one component to another. A one-way clutch is a device that will allow a first component to freely move, without transmitting the drive load to a second component, when the first component moves in one direction relative to the second component, but will transmit the drive load from the first component to the second component when the first component attempts to move in another direction relative to the second component. A bearing is a device that can support a non-drive load across two components freely moving relative to one another. This invention, a multi-mode rolling element clutch assembly, involves the use of rolling elements and special first and second race members to combine the capabilities of a bearing, i.e., supporting a non-drive load across two components while the components freely move relative to one another, and a clutch, i.e., transmitting a drive load across the two components when they attempt to move relative to one another. This invention further involves a mechanism to change the mode in which the rolling element clutch assembly operates. In a first mode, the rolling element clutch assembly of the present invention supports a non-drive load across two components when the first component freely moves in a first direction relative to the second component (bearing setting) and transmits a drive load across the two components when the first component attempts to move in a second direction relative to the second component (clutch setting). In a second mode, the directions in which the clutch assembly operates in the bearing setting and the clutch setting are reversed. In this second mode, the rolling element clutch assembly supports a non-drive load across two components when the first component freely moves in the second direction relative to the second component (bearing setting) and transmits a drive load across the two components when the first component attempts to move in the first direction relative to the second component (clutch setting). In a third mode, the clutch assembly operates in the bearing setting in both directions of relative travel between the components, and in a fourth mode, the clutch assembly operates in the clutch setting in both directions of relative travel (or, in this setting, attempted relative travel) between the components. Furthermore, this invention can accommodate both linear motions and linear load transmission and rotational motions and rotational load, or torque, transmission.

FIGS. 1 through 4B illustrate a first embodiment of a multi-mode rolling element clutch. As best shown in FIGS. 1 and 2A, a clutch assembly 14 has a first race member 16 defining a first race surface 17 and a second race member 18 defining a second race surface 19. In the embodiment of FIG. 1, the first and second race members 16, 18 are concentric. The first race surface 17 and the second race surface 19 lie proximate to, opposed to, and aligned with, one another. A raceway 20 is defined by and between the opposed, aligned race surfaces 17, 19.

Figure 2B:
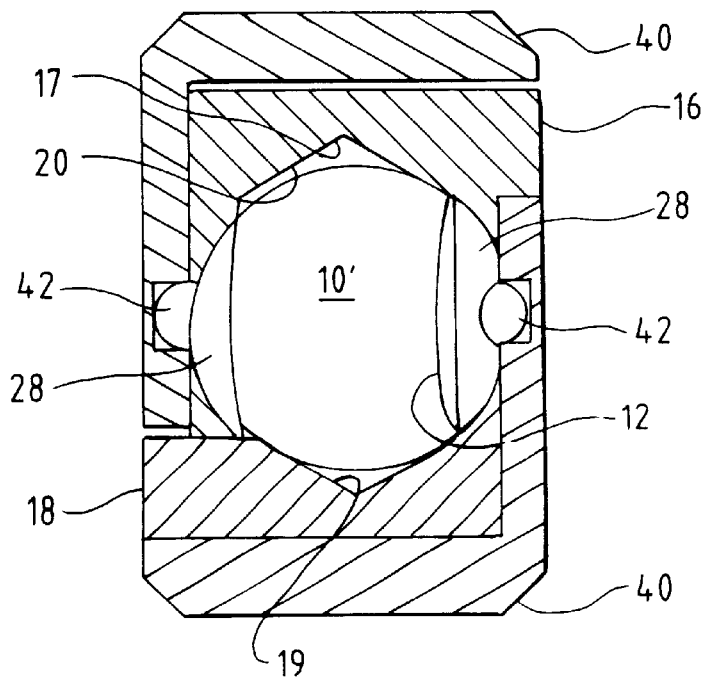
FIG. 2B is a radial cross-sectional view of the embodiment of FIG. 1, showing a rolling element in the clutch setting.

As best shown in FIGS. 2B, 3A, and 3B, a plurality of rolling elements 10, or in this instance, modified ball bearings 10', are located within raceway 20. The modified ball bearings 10' may be formed by taking spherical ball bearings and grinding flat their north and south poles. During operation of the clutch assembly 14, these flatten poles 12 of the modified balls 10' act as pawls.

The first race surface 17 and the second race surface 19 each have a ratchet surface portion 22. When the first and second race members 16,18 rotate in the bearing setting direction (FIG. 3A), the modified balls 10' roll past the ratchet surface portions 22. When the race members 16,18 start to rotate in the clutch setting direction (FIG. 3B), the modified balls 10', which will naturally wobble slightly, twist just enough to engage the ratchet surface portions 22 of both the race members 16,18, thereby locking the race members 16,18 together. The clutch assembly 14 can then transmit load through the modified balls 10' and the ratchet surface portions 22, which act to wedge the modified balls 10' between the race members 16,18.

In accordance with the invention, the ratchet surface portions have a multi-mode ratchet mechanism for providing a first and a second ratchet configuration. As best shown in FIG. 3C, the ratchet surface portions 22 of the race members 16,18 each have a ratchet wall 24 defining a row of a plurality of concavities 26, the row extending along the length of the raceway 20. As best shown in FIGS. 4A and 4B, the ratchet surface portions 22 further include a plurality of ratchet segments 28 located within the concavities 26. Preferably, the ratchet segments 28 lie completely within the concavities 26 and do not extend past the raceway surface 30 of the ratchet wall 24 defining the concavities 26. Within each of the concavities 26, the ratchet segments 28 are movable from a first position corresponding to the first configuration of the multi-mode ratchet mechanism (FIG. 4A) to a second position corresponding to the second configuration of the multi-mode ratchet mechanism (FIG. 4B).

Each ratchet segment 28 has a back surface 32, preferably having a profile which complements the profile of the concavities 26. Furthermore, each ratchet segment 28 has a front surface 34, preferably formed from a first flat plane 36 and a second flat plane 38. In the first position of the ratchet segment 28, the first flat plane 36 preferably lies approximately flush with the raceway surface 30 of the ratchet wall 24 and the second flat plane 38 preferably forms an incline from the raceway surface 30 to below the raceway surface 30. At the bottom of the incline of the second flat plane 38, the flat plane 38 lies adjacent the wall of the concavity 26. The wall of the concavity 26 which extends up to the raceway surface 30, is generally perpendicular to the raceway surface 30, i.e., typically within 20° of the perpendicular. Thus, an indentation in the raceway surface 30 of the ratchet surface portion 22 is formed from the inclined flat plane 38 of the ratchet segment 28 and the generally perpendicular wall of the concavity 26. These indentations are sized to accommodate the flattened poles 12 of the modified balls 10', thereby allowing these modified balls 10' to act as pawls.

Conversely, in the second position of the ratchet segment 28 within the concavity 26, the second flat plane 38 preferably lies approximately flush with the raceway surface 30 of the ratchet wall 24 and the first flat plane 36 preferably forms an incline from the raceway surface 30 to below the raceway surface 30. In this configuration, similar to that described above, an indentation is formed in the ratchet surface portion 22 by the interaction of the first flat plane 36 in conjunction with the ratchet wall 24.

The ratchet segments 28 are preferably formed from spherical segments. However, these ratchet segments 28 could also be formed from cylindrical, rectangular, prismatic, or other appropriately shaped segments.

In accordance with the first embodiment, the ratchet segments 28 are moved from the first position to the second position, and vice versa, by a reversing member 40.

As shown in FIGS. 4A and 4B, the reversing member 40 lies adjacent the side of the ratchet wall 24 that is opposite the raceway surface 30. The reversing member 40 acts upon each of the ratchet segments 28 via coupling members 42. In accordance with the first embodiment, the reversing member 40 is formed from a plate having cutouts 44 for accommodating an end of the coupling members 42.

In the present embodiment, coupling members 42 are formed from short stubs having first and second ends. The first ends of the coupling members 42 are directly attached to the back surfaces 32 of the ratchet segments 28. The second ends of the coupling members 42 are movably positioned within cutouts 44 in the reversing member 40. Sliding the reversing member 40 relative to the ratchet wall 24 causes the cutouts 44 to move in the sliding direction, thereby forcing the second ends of the stubs to also shift in the sliding direction. This movement of the end of the coupling member 42 that is coupled to the reversing member 40 causes the ratchet segments 28 to pivot from their first position to their second position, or vice versa. Only a small movement of the reversing member 40 relative to the ratchet wall 24 is necessary to shift the ratchet segments 28 between their first and second positions.

Other configurations for the reversing member are within the spirit of the invention. For instance, the reversing member could be a multi-fingered mechanism attached directly to each ratchet segment. Furthermore, the reversing member could cause the ratchet segments to slide, pivot, tilt, or rotate and, even further, the ratchet segments could be controlled by mechanical, pneumatic, hydraulic, electrical, or even thermal-mechanical super-elastic mechanisms. Additionally, some or all of the ratchet segments could be controlled. Moreover, each ratchet segment could be individually controlled.

The coupling members 42 need not be the stubs which are illustrated in the first embodiment. For instance, the coupling members could be teeth meshed with teeth on the reversing member, levers, pins, flexible fingers, or cams. Furthermore, each coupling member could be biased in one or more directions by, for instance, an inherent elasticity or a separate and distinct spring element.

Also in accordance with the first embodiment, a first reversing member 40 is associated with the first race member 16 and a second reversing member 40 is associated with the second race member 18. These reversing members 40 are free to travel with their associated race members 16, 18 when the race members 16, 18 move relative to one another. In this travel mode, there is generally no relative motion or sliding between the reversing members 40 and the race members 16, 18. Thus, as the race members 16, 18 move relative to one another, the multi-mode ratchet mechanism remains in its established, or set, ratchet configuration.

When shifting from the first ratchet configuration to the second ratchet configuration, or vice versa, the sliding of the first reversing member 40 relative to the first race member 16 may be coordinated with the sliding of the second reversing member 40 relative to the second race member 18. Although not shown, the design of such a coordinating mechanism, for instance a sprocket, lever, or camming device, would be obvious to a person skilled in the art.

Furthermore, the multi-mode ratchet mechanism could be triggered automatically after a preset, or variable, amount of relative motion between the first and second race members, or simply a given or preset amount of travel of the associated race member. The multi-mode ratchet mechanism could also be triggered at a preset time of travel, a given level of load transmission, or any other limiting parameter. For instance, to prevent overload, the catch of a spring-loaded reversing member could be mechanically, electrically or otherwise released upon reaching a preset level of load transmission in the clutch setting.

Also, in accordance with the invention, the multi-mode ratchet mechanism could provide a neutral ratchet configuration, wherein the ratchet segments 28 assume a neutral position. Such a neutral configuration would allow the clutch assembly 14 to operate entirely in a bearing setting, i.e., the first race member 16 would freely move relative to the second race member 18 in both the first and the second. In this neutral ratchet configuration, at least a portion of both the leading and the trailing edges of the ratchet segments 28 lie flush with the raceway surface 30, and no indentations capable of wedging the modified balls 10' between the race members 16, 18 are formed. For instance, with the first flat plane 36 lying flush with the raceway surface 30, the ratchet segments 28 could be pivoted 90° around the axis of the coupling member 42. Thus, the flat plane 36 would now extend across the concavity 26 in the direction of travel of the modified balls 10', allowing the modified balls 10' to travel across and past the concavities 26 in both directions. Although, the second flat plane 38 would still form an indentation, this indentation would be 90° to the direction of travel of the modified balls 10' and thus, the modified balls 10' could not become wedged between the race members 16,18. Alternatively, the ratchet segments 28 could be made in two halves and a central wedge-shaped coupling member could slide in between the halves, thereby forcing both the first and the second flat planes to lie flush with the raceway surface 30.

Further, in accordance with the invention, the multi-mode ratchet mechanism could provide a double-clutch ratchet configuration, wherein the ratchet segments 28 assume a double-clutch position. Such a double-clutch configuration would allow the clutch assembly 14 to transmit load between the race members 16, 18 in both directions of relative motion. In this double-clutch ratchet configuration, indentations would be formed at both the leading and the trailing edges of the ratchet segments. For instance, the ratchet segments 28 could be partially pivoted from the first position to the second position. Thus, in the first position, if the first flat plane 36 of the ratchet segment 28 is flush with the raceway surface 30 and the incline of the second flat plane 38 is angled 30° from the raceway surface 30, in the double-clutch position, the first and second flat planes 36, 38 could each be angled 15° from the raceway surface 30. The modified balls 10' would become wedged between the race members 16, 18 in both directions of relative motion.

In operation, when the multi-mode ratchet mechanism is in the first configuration, the rolling elements provide rolling support between the first race member and the second race member when the first race member moves in a first direction relative to the second race member. This is the bearing setting. The clutch assembly 14 operates in a bearing setting when the rolling elements or modified balls 10' provide rolling support between the first and second race members 16, 18. When the multi-mode ratchet mechanism is in the first configuration, and when the race member 16 moves in a first direction relative to the race member 18, the modified balls 10' simply roll past the indentations and the ratchet elements 28. The modified balls 10' first roll over and across the portion of the ratchet elements 28 which in conjunction with the concavities 26 form the indentations in the raceway surface 30 and then roll over the portion of the ratchet elements 28 which are flush with the raceway surface 30. Because of the direction of travel of the modified balls 10' relative to the race members 16, 18, the modified balls 10' do not get stuck in the indentations. Rather, the edge of any modified ball 10' that wobbles into an indentation is guided back to the raceway surface 30 by the inclined flat plane of the ratchet segment 28. As shown in FIG. 3A, in the bearing setting, the modified balls 10' simply roll over and past the indentations and then across the flush surfaces of the ratchet segments 28.

While still in the first ratchet mechanism configuration, if the first race member 16 changes direction and now moves in a second direction relative to the second race member 18, at least one of the plurality of rolling elements engages the ratchet surface portion 22, as best shown in FIG. 3B. In this engaged or clutch setting, the surfaces of the ratchet elements 28 which are flush to the raceway surface 30 are the leading surfaces. The modified balls 10' roll past the flush surfaces of the ratchet segments 28 and then, due to slight inherent wobbles, at least one of the modified balls 10' falls into an indentation. As the race members 16, 18 continue to try to move relative to one another, the modified ball 10' becomes wedged within the indentations of the race members 16, 18, thereby impeding relative motion between the first and second race members 16, 18 and providing load transmission capability.

The direction in which the clutch assembly 14 operates in the bearing setting can be reversed by sliding the reversing members 40 relative to the race members 16, 18, thereby shifting the ratchet segments 28 from their first to their second positions, as described above. Thus, if originally the clutch assembly 14 operated in the bearing setting when the first race member 16 moved in the first direction relative to the second race member 18, the clutch assembly 14 would now operate in the clutch setting when the first race member 16 moved in the first direction relative to the second race member 18. Correspondingly, if originally the clutch assembly 14 operated in the clutch setting when the first race member 16 moved in the second direction relative to the second race member 18, the clutch assembly 14 would now operate in the bearing setting when the first race member 16 moved in the second direction relative to the second race member 18. Thus, the direction in which the clutch assembly 14 operates in the bearing setting is reversed via the operation of the multi-mode ratchet mechanism, and likewise, the direction in which the clutch assembly 14 operates in the clutch setting is also reversed.

When the multi-mode ratchet mechanism is in the second configuration, the operation of the clutch assembly 14 is similar to the operation of the clutch assembly 14 when the multi-mode ratchet mechanism is in the first configuration. In the second configuration, the rolling elements provide rolling support between the first race member and the second race member when the first race member moves in a second direction relative to the second race member. The multi-mode ratchet mechanism is in the second configuration when the ratchet segments 28 are in a second position. The clutch assembly 14 operates in a bearing setting, i.e., the rolling elements or modified balls 10' provide rolling support between the first and second race members 16, 18, when the race members 16 moves in a second direction relative to race member 18 such that the surfaces of the ratchet elements 28 which form the indentations in the raceway surface 30 are the leading surfaces. As shown in FIG. 3A, in the bearing setting, the modified balls 10' simply roll past the indentations and then across the flush surfaces of the ratchet segments 28.

Then, as above, while still in the second ratchet mechanism configuration, if the first race member 16 reverses direction and now moves in a first direction relative to the second race member 18, at least one of the plurality of rolling elements engages the ratchet surface portion 22, as best shown in FIG. 3B. In this engaged mode, the surfaces of the ratchet elements 28 which are flush to the raceway surface 30 are the leading surfaces. The modified balls 10' roll past the flush surfaces of the ratchet segments 28 and then, due to slight inherent wobbles, become stuck in the indentations. The modified balls 10' become wedged between the race members 16, 18, thereby impeding relative motion between the first and second race members 16, 18 and providing load transmission capability.

In one permutation of the first embodiment of the present invention, the first race member 16 may be connected to a driven member (not shown) and the second race member 18 may be connected to a driving member (not shown) or vice versa. Furthermore, the rolling element clutch could be machined into the mechanism that uses its functions, making an even more compact assembly. For example, the first race may be part of a shaft and the second race may be machined into a housing. The number of rolling elements 10 and the number of ratchets 22 on each race 16, 18 can be varied to increase the number of possible engagements. This would decrease the minimum backlash angle. Even further, the number of rolling elements 10 and ratchets 22 could be optimized to increase the number of simultaneous engagements. This would maximize the load transmitting capability of the clutch assembly.

In another permutation to the first embodiment, the rolling elements 10 need not be modified balls 10', as described above, but could be rollers, hollow balls, hollow rollers, pegged balls, conical bearings, barrel-shaped bearings, or other suitable configurations as described in U.S. application Ser. No. 09/206,618. Even further, the rolling elements 10 could be spherical, in which case each indentation formed by the front surface 34 of the ratchet segment 28 and the concavity 26 could be an inclined ramp extending down to a partial spherical pocket, i.e., a quasi- teardrop shaped indentation, as described below.

Figure 5:
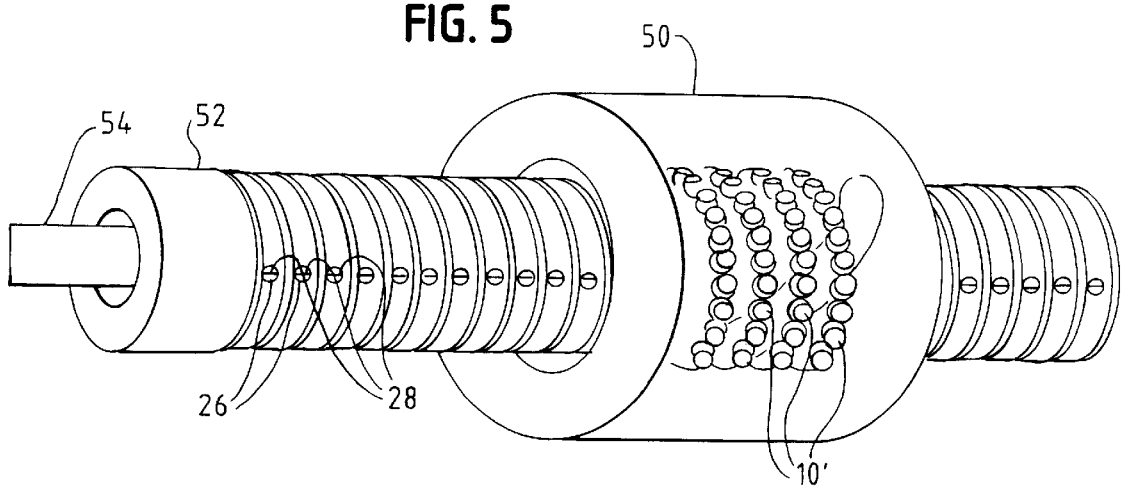
FIG. 5 is a perspective view of a second embodiment of the present invention with a partial cut-away showing the rolling elements within the ball screw nut.

FIG. 5 schematically illustrates a second embodiment of the present invention. In this embodiment, a relatively standard recirculating ball screw nut and ball screw has been modified to create a multi-mode ball-screw rolling-element clutch assembly. In a first configuration, this multi-mode ball-screw rolling-element clutch assembly may operate in the bearing setting as the ball screw nut travels in a first direction and in the clutch setting as the ball screw nut tries to move in a second direction. In a second configuration, the direction in which the ball screw nut travels in the bearing setting may be reversed, as may the direction in which the ball screw nut tries to travel in the clutch setting.

A ball screw 52 with a series of concavities 26 for accommodating ratchet segments 28 is provided. As described above, within each of the concavities 26, the ratchet segments 28 are movable from a first position corresponding to the first configuration of the multi-mode ratchet mechanism to a second position corresponding to the second configuration of the multi-mode ratchet mechanism.

A ball screw nut 50 travels along the length of the ball screw 52. The ball screw nut 50 contains modified balls 10', which provide rolling support between the ball screw nut 50 and the ball screw 52 in the bearing setting, and which become wedged between the ball screw nut 50 and the ball screw 52 in the clutch setting thereby providing load transmission capability.

A ball screw reversing member 54 is provided to change the orientation of the ratchet segments 28 from the first position to the second position, and vice versa. Similar to the first embodiment described above, the reversing member 54 acts upon each of the ratchet segments 28 via coupling members (not shown). In accordance with the second embodiment, the reversing member 54 is formed from a rod inserted through a central through hole in the ball screw 52. The rod may be of any suitable cross-section, length, or material.

Figure 6:
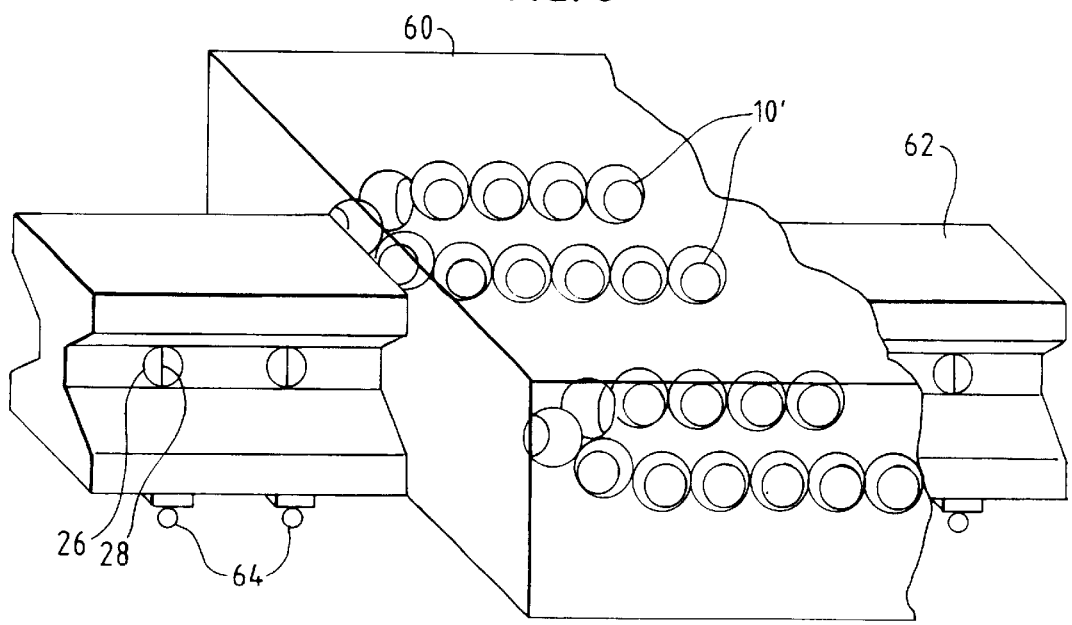
FIG. 6 is a perspective view of a third embodiment of the present invention with a partial cut-away showing the rolling elements within the carrier.
Figure 7:
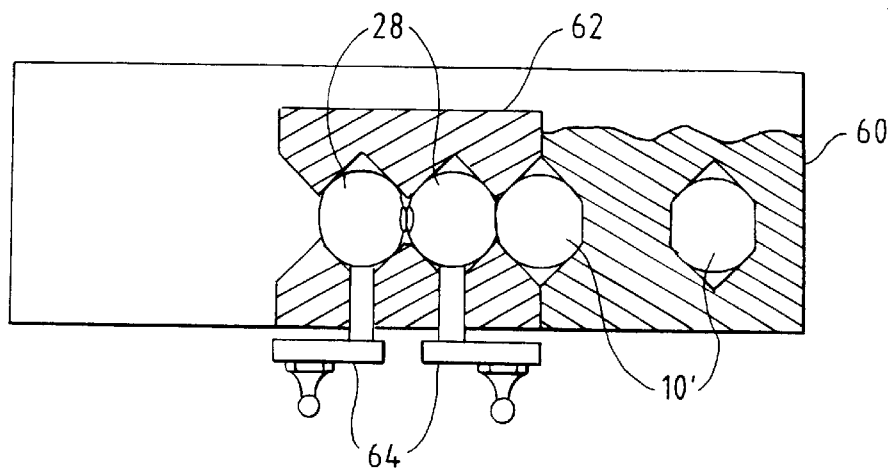
FIG. 7 is a cross-sectional side view of the embodiment of FIG. 6 with a portion of the carrier cut away to show the recirculating rolling elements.
Figure 8:
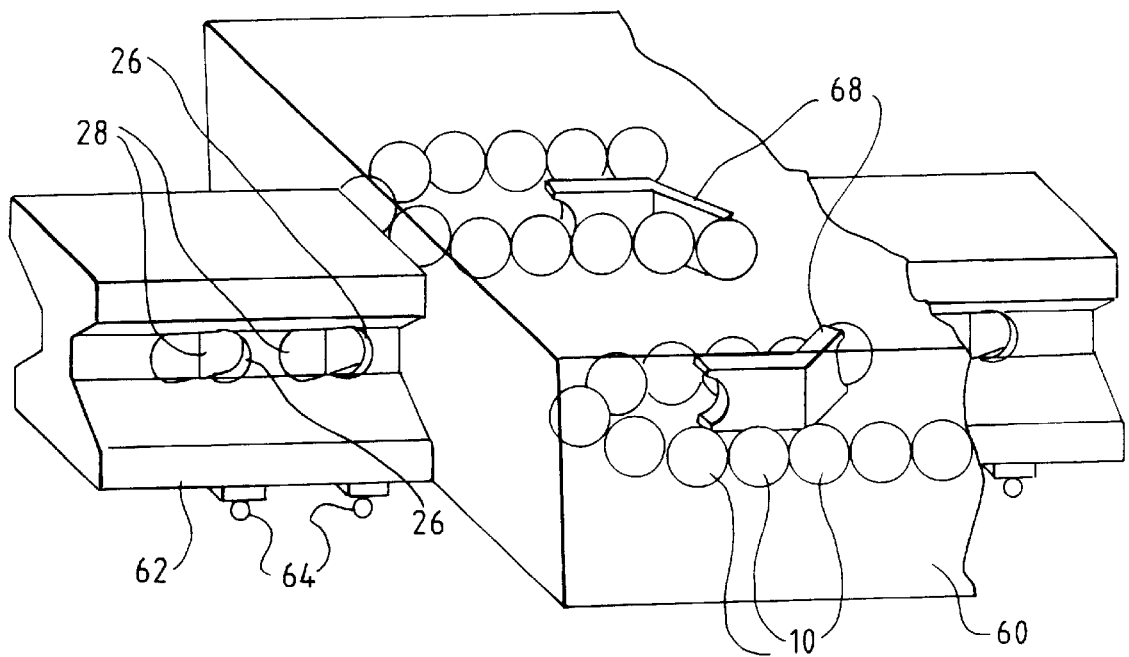
FIG. 8 is a perspective view of the embodiment of FIG. 6 with a partial cut-away showing the rolling elements within the carrier and illustrating the use of spherical ball bearings as the rolling elements and double tear-drop shaped concavities and ratchet segments.

FIGS. 6 through 8 illustrate a third embodiment of the present invention. In this embodiment, a typical recirculating ball linear bearing has been modified, similarly to the recirculating ball nut and ball screw described above, to create a multi-mode recirculating rolling-element linear clutch assembly. In a first configuration, this multi-mode recirculating rolling-element linear clutch assembly operates in a bearing setting as the carrier travels in a first direction relative to the track and in a clutch setting as the carrier tries to move in a second direction. In a second configuration, the clutch assembly operates in the bearing setting when the carrier travels in the second direction, i.e., the direction of operation in the bearing setting is reversed. Similarly, in the second configuration, the clutch assembly now operates in the clutch setting when the carrier tries to travel in the first direction relative to the track.

As best shown in FIG. 6, a track 62 with a series of concavities 26 for accommodating ratchet segments 28 is provided. As described above with respect to both the first and second embodiments, within each of the concavities 26, the ratchet segments 28 are movable from a first position corresponding to the first configuration of the multi-mode ratchet mechanism to a second position corresponding to the second configuration of the multi-mode ratchet mechanism. The track 62 need not be linear, but could follow a circular path as might be used for a large dish tracking antenna or a curvilinear path as might be used in a roller coaster.

A recirculating rolling-element carrier 60 travels along the length of the track 62. The recirculating carrier 60 contains modified balls 10', which provide rolling support between the recirculating carrier 60 and the track 62 in the bearing setting, and which become wedged between the recirculating carrier 60 and the track 62 in the clutch setting thereby providing load transmission capability.

A plurality of track reversing members 64 are provided to change the orientation of the ratchet segments 28 from the first position to the second position, and vice versa. The reversing members 64 act upon each of the ratchet segments 28 via coupling members 66, and in accordance with the third embodiment, the reversing members 64 individually rotate the ratchet segments 28 from a first position to a second position.

In FIG. 8 a permutation of the third embodiment is illustrated, wherein the rolling elements 10 are spherical ball bearings and each indentation, formed from the front surface 34 of the ratchet segment 28 and a side of the concavity 26, is a quasi-teardrop shaped pocket, I.e., the front surface 34 of the ratchet segment 28 forms an inclined ramp extending down into a partial spherical pocket in the concavity 26. These partial spherical pockets are sized to accommodate the spherical ball bearings. In both the bearing setting and the clutch setting, the spherical ball bearings may drop into the teardrop shaped pockets. However, in the bearing setting, the spherical ball bearings are forced to roll up the inclined ramp and out of the pockets by bearing separators traveling within the raceway 20, by spring-loaded guides 68 (springs not shown), or even by subsequent ball bearings traveling down the raceway 20. Thus, in the bearing setting, the spherical ball bearings do not get lodged in the indentations. In the clutch setting, once a spherical ball bearing drops into the teardrop shaped pocket subsequent ball bearings traveling down the raceway 20, or alternatively, spring-loaded guides 68, force and retain the spherical ball bearing in the bottom of the teardrop shaped pocket, thereby locking the track 62 and the recirculating carrier 60 together.

All of the permutations and various configurations described above in connection with the various elements of the first embodiment are equally applicable to the second and third embodiments of the invention. For instance, variations in the configurations of the ratchet segments, reversing members, and/or rolling elements are all within in the scope of the present invention. Furthermore, various methods of positioning and/or biasing the ratchet segments, reversing members, and/or rolling elements are conceivable, as are various methods for actuating the reversing members. Moreover, shifting of the ratchet segments may be individually controlled or coordinated.

Even other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A multi-mode rolling element clutch assembly, comprising:
    a first race member defining a first race surface having a first ratchet surface portion;
    a second race member defining a second race surface, the first race surface and the second race surface defining a raceway therebetween;
    a plurality of rolling elements disposed in the raceway;
    solid rolling elements located between and supporting said inner race member and said outer race member;
    the first ratchet surface portion having a first multi-mode ratchet mechanism for providing a first and a second ratchet configuration.

2. The multi-mode rolling element clutch assembly of claim 1 wherein, when the first multi-mode ratchet mechanism is in the first ratchet configuration, the rolling elements provide rolling support between the first race member and the second race member when the first race member moves in a first direction relative to the second race member.

3. The multi-mode rolling element clutch assembly of claim 2 wherein, when the first multi-mode ratchet mechanism is in the first ratchet configuration, at least one of the plurality of rolling elements engages the first ratchet surface portion when the first race member moves in a second direction relative to the second race member, thereby impeding relative motion between the first race member and the second race member and providing load transmission capability.

4. The multi-mode rolling element clutch assembly of claim 3 wherein, when the first multi-mode ratchet mechanism is in the second ratchet configuration, at least one of the plurality of rolling elements engages the first ratchet surface portion when the first race member moves in the first and second directions relative to the second race member, thereby impeding relative motion between the first race member and the second race member and providing load transmission capability.

5. The multi-mode rolling element clutch assembly of claim 3 wherein, when the first multi-mode ratchet mechanism is in the second ratchet configuration, the rolling elements provide rolling support between the first race member and the second race member when the first race member moves in the second direction relative to the second race member.

6. The multi-mode rolling element clutch assembly of claim 5 wherein, when the first multi-mode ratchet mechanism is in the second ratchet configuration, at least one of the plurality of rolling elements engages the first ratchet surface portion when the first race member moves in the first direction relative to the second race member, thereby impeding relative motion between the first race member and the second race member and providing load transmission capability. member when the first race member moves in the second direction relative to the second race member.

7. The multi-mode rolling element clutch assembly of claim 1 wherein the first and second race members are concentric.

8. A multi-mode rolling element clutch assembly, comprising:
    a first race member defining a first race surface having a first ratchet surface portion;
    a second race member defining a second race surface, the first race surface and the second race surface defining a raceway therebetween;
    a plurality of rolling elements disposed in the raceway;
    the first ratchet surface portion having a first multi-mode ratchet mechanism for providing a first and a second ratchet configuration, wherein the first multi-mode ratchet mechanism includes at least one ratchet segment movable from a first position to a second position, a ratchet wall defining at least one concavity for accommodating the at least one ratchet segment, and a reversing member coupled to the at least one ratchet segment and for moving the at least one ratchet segment from the first position to the second position.

9. A multi-mode rolling element clutch assembly, comprising:
    a first race member defining a first race surface having a first ratchet surface portion;
    a second race member defining a second race surface, the first race surface and the second race surface defining a raceway therebetween;

a plurality of rolling elements disposed in the raceway;

the first ratchet surface portion having a first multi-mode ratchet mechanism for providing a first and a second ratchet configuration, wherein the second race member has a second ratchet surface portion having a second multi-mode ratchet mechanism for providing a third and fourth ratchet configuration.

10. The multi-mode rolling element clutch assembly of claim 9 wherein the first and second multi-mode ratchet mechanisms each include at least one ratchet segment movable from a first position to a second position, a ratchet wall defining at least one concavity for accommodating the at least one ratchet segment, and a reversing member coupled to the at least one ratchet segment and for moving the at least one ratchet segment from the first position to the second position.

11. The multi-mode rolling element clutch assembly of claim 9, wherein, when the second multi-mode ratchet mechanism is in the third ratchet configuration, the rolling elements provide rolling support between the first race member and the second race member when the first race member moves in a first direction relative to the second race member.

12. The multi-mode rolling element clutch assembly of claim 9 wherein, when the second multi-mode ratchet mechanism is in the third ratchet configuration, at least one of the plurality of rolling elements engages the second ratchet surface portion when the first race member moves in a second direction relative to the second race member, thereby impeding relative motion between the first race member and the second race member and providing load transmission capability.

13. The multi-mode rolling element clutch assembly of claim 12 wherein, when the second multi-mode ratchet mechanism is in the fourth ratchet configuration, the rolling elements provide rolling support between the first race member and the second race member when the first race member moves in the second direction relative to the second race member.

14. The multi-mode rolling element clutch assembly of claim 13 wherein, when the second multi-mode ratchet mechanism is in the fourth ratchet configuration, at least one of the plurality of rolling elements engages the second ratchet surface portion when the first race member moves in the first direction relative to the second race member, thereby impeding relative motion between the first race member and the second race member and providing load transmission.

15. A multi-mode rolling element clutch assembly, comprising:

a first race member defining a first race surface having a first ratchet surface portion;

a second race member defining a second race surface, the first race surface and the second race surface defining a raceway therebetween;

a plurality of rolling elements disposed in the raceway;

the first ratchet surface portion having a first multi-mode ratchet mechanism for providing a first and a second ratchet configuration, wherein, when the first multi-mode ratchet mechanism is in the first ratchet configuration, the rolling elements provide rolling support between the first raced member and the second race member when the first race member moves in a first direction relative to the second race member, and wherein, when the first multi-mode ratchet mechanism is in the first ratchet configuration, at least one of the plurality of rolling elements engages the first ratchet surface portion when the first race member moves in a second direction relative to the second race member, thereby impeding relative motion between the first race member and the second race member and providing load transmission capability, and wherein, when the first multi-mode ratchet mechanism is in the second ratchet configuration, the rolling elements provide rolling support between the first race member and the second race member when the first race member moves in the first and second directions relative to the second race member.

16. A multi-mode rolling element clutch assembly, comprising:

a first race member defining a first race surface having a first ratchet surface portion;

a second race member defining a second race surface, the first race surface and the second race surface defining a raceway therebetween;

a plurality of rolling elements disposed in the raceway;

the first ratchet surface portion having a first multi-mode ratchet mechanism for providing a first and a second ratchet configuration, wherein the second race member has a second ratchet surface portion having a second multi-mode ratchet mechanism for providing a third and fourth ratchet configuration, and wherein, when the second multi-mode ratchet mechanism is in the third ratchet configuration, the rolling elements provide rolling support between the first race member and the second race member when the first race member moves in a first direction relative to the second race member, and wherein, when the second multi-mode ratchet mechanism is in the third ratchet configuration, at least one of the plurality of rolling elements engages the second ratchet surface portion when the first race member moves in a second direction relative to the second race member, thereby impeding relative motion between the first race member and the second race member and providing load transmission capability and wherein, when the second multi-mode ratchet mechanism is in the fourth ratchet configuration, the rolling elements provide rolling support between the first race member and the second race member when the first race member moves in the first and second directions relative to the second race member.

17. A multi-mode rolling element clutch assembly, comprising:

a first race member defining a first race surface having a first ratchet surface portion;

a second race member defining a second race surface, the first race surface and the second race surface defining a raceway therebetween;

a plurality of rolling elements disposed in the raceway;

said rolling elements separating the inner flat race member for the second race member;

the first ratchet surface portion having a first multi-mode ratchet mechanism for providing a first and a second ratchet configuration, wherein the second race member has a second ratchet surface portion having a second multi-mode ratchet mechanism for providing a third and fourth ratchet configuration, and wherein, when the second multi-mode ratchet mechanism is in the third ratchet configuration, the rolling elements provide rolling support between the first race member and the second race member when the first race member moves in a first direction relative to the second race member, and wherein, when the second multi-mode ratchet mechanism is in the third ratchet configuration, at least one of the plurality of rolling elements engages the second ratchet surface portion when the first race member moves in a second direction relative to the second race member, thereby impeding relative motion between the first race member and the second race member and providing load transmission capability and wherein, when the second multi-mode ratchet mechanism is in the fourth ratchet configuration, at least one of the plurality of rolling elements engages the second ratchet portion when the first race member moves in the first and second directions relative to the second race member, thereby impeding relative motion between the first race member and the second race member and providing load transmission capability.

* * * * *

UNITED STATES PATENT AND TRADEMARK OFFICE
CERTIFICATE OF CORRECTION

PATENT NO.    : 6,315,098 B1        Page 1 of 1
DATED         : November 13, 2001
INVENTOR(S)   : John Edward Roberts It is certified that error appears in the above-identified patent and that said Letters Patent is hereby corrected as shown below:

<u>Column 11,</u>
Line 13, delete "Le.," and insert -- i.e., --

<u>Column 12,</u>
Lines 37-38, delete last sentence as follows: "member when the first race member moves in the second direction relative to the second race member."

Signed and Sealed this

Fourteenth Day of May, 2002

*Attest:*

*Attesting Officer*

JAMES E. ROGAN
*Director of the United States Patent and Trademark Office*